Nov. 21, 1939.   J. PRINCE   2,180,609
GENERATOR TURNTABLE MOUNTING
Filed Aug. 5, 1937
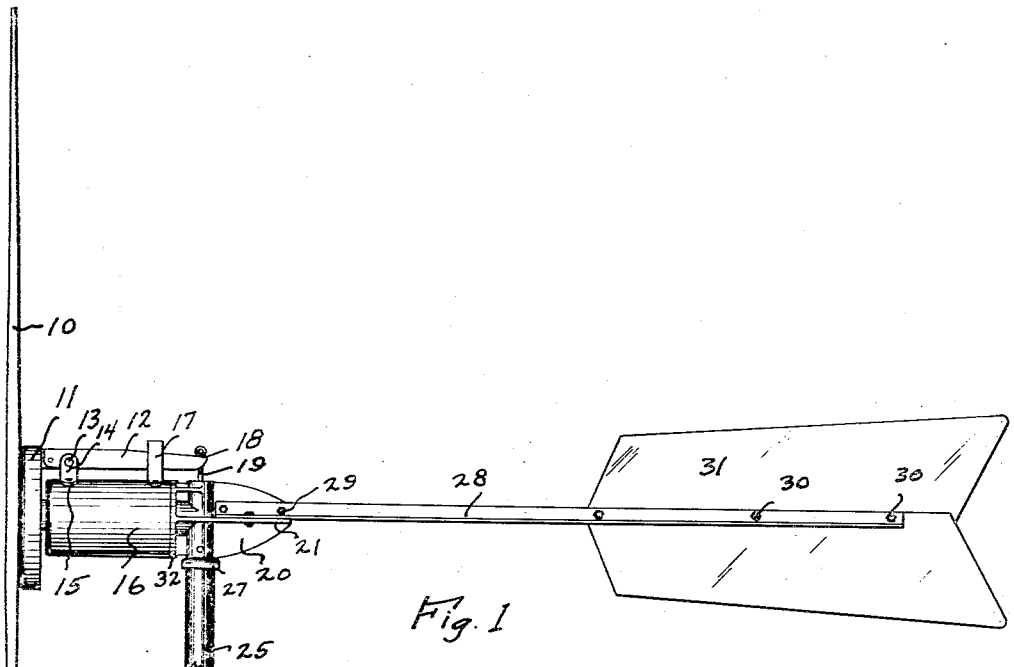
Fig. 1
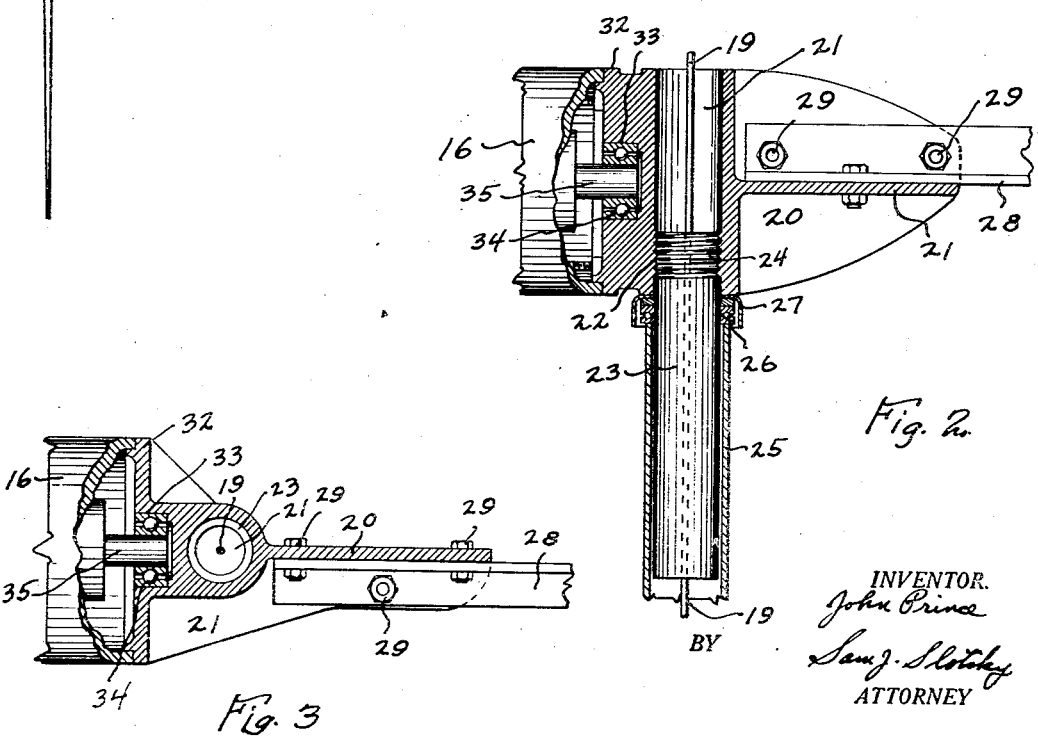
Fig. 2
Fig. 3
INVENTOR.
John Prince
BY Sam J. Slotsky
ATTORNEY Patented Nov. 21, 1939

2,180,609

UNITED STATES PATENT OFFICE 2,180,609

GENERATOR TURNTABLE MOUNTING

John Prince, Sioux City, Iowa, assignor to Wincharger Corporation, Sioux City, Iowa, a corporation of Minnesota Application August 5, 1937, Serial No. 157,576

7 Claims. (Cl. 290—55)

My invention relates to a generator turntable mounting for wind driven generators or similar types.

An object of my invention is to provide a turntable which will swivel or pivot freely upon a vertical axis.

A further object of my invention is to provide means associated with the turntable to rigidly support the tail vane of the generator arrangement.

A further object of my invention is to provide a certain structure to such mounting so that a braking mechanism can be operated conveniently therewith.

A further object of my invention is to provide a bearing recess in combination with the mounting so that the same can be employed with a generator.

A further object of my invention is to provide other advantages readily apparent from the construction thereof and to provide a simple structure.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a transverse view showing an assembly of a wind driven generator employing my type of turntable mounting.

Figure 2 is an enlarged sectional detail of the turntable, and

Figure 3 is a plan view of Figure 2 taken in section.

I have used the character 10 to designate generally a wind driven blade or propeller to which is attached a cylindrical brake band housing 11. A brake rod 12 is pivoted at 13 to a bracket 14 which is attached at 15 to the generator 16. The arm 12 is received within a suitable clip 17 and the arm 12 extends inwardly and is attached at 18 to a suitable vertical wire 19 which is used for controlling the braking arrangement. The turntable mounting is indicated generally by the character 20. The mounting is formed of an integral casting having a vertical opening 21. The lower end of the opening 21 includes the threads 22 and a hollow cylindrical pipe 23 includes the upper threads 24 which are threadably and tightly engaged with the aforesaid threads 22.

The brake control wire 19 passes downwardly through the hollow tube 23 so that the same can be controlled from the ground. The tube 23 is rotatably received within the fixed further tube 25 which is attached to the tower of the wind charging arrangement and a roller bearing arrangement 26 is interposed between the top of the tube 25 and the lower portion of the mounting. A cup member 27 is also attached to the mounting to protect the bearing.

The turntable mounting 20 also includes a laterally projecting rib 21 to which is attached the angular iron member 28 by means of suitable bolts 29. The angle member 28 extends rearwardly and is attached at 30 to the tail vane 31. The casting 20 also includes the further cylindrical portion 32 which includes a cylindrical cavity 33 into which is received the bearings 34 for the shaft 35 of the generator 16. The member 32 is securely bolted to the outer generator frame.

In this manner the turntable mounting provides a means for securing the generator directly to the support, and includes means for supporting the tail vane. This arrangement also provides means for bearing the structure upon a freely rotating pivotal mechanism and also provides means for receiving the end bearing of the generator without the necessity of using extra parts. The arrangement also permits of the use of a braking control through a vertical opening therein and it will also be noted that the arrangement is simple in structure.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A generator turntable mounting comprising a pivoting member, said pivoting member having a forward cylindrical horizontal cavity adapted to receive a generator shaft bearing, means for attaching a tail vane structure to said mounting.

2. In combination with a generator a pivotal turntable mounting including a portion thereof adapted to be attached to a generator frame and to provide a rear plate therefor.

3. A generator turntable mounting comprising a pivoting member having a vertical opening, a male pipe member attached to the said opening, a stationary pipe member receiving said male member, said pivoting member including a rearwardly extending rib for attachment to a tail vane structure, said pivoting member having a centrally located cavity at the forward end thereof, said cavity adapted to receive a generator shaft bearing, means for peripherally attaching a generator to said forward end.

4. A generator turntable mounting comprising an integral casting having a vertical opening, means cooperant with said opening to provide pivoting action to the turntable mounting, said mounting including a rearwardly extending rib for attachment to a tail vane structure, and said mounting having a cylindrical forward cavity positioned at right angles to said vertical opening, said cavity adapted to provide a recess for the insertion of a generator shaft bearing.

5. A generator turntable mounting comprising a pivoting member having a vertical opening, a male pipe member attached to the bottom of said opening, a stationary pipe member receiving said male member, said pivoting member including a rearwardly extending rib for attachment to a tail vane structure, said pivoting member having a centrally located cavity at the forward end thereof, said cavity adapted to receive a generator shaft bearing, means for peripherally attaching a generator to said forward end.

6. A generator turntable mounting comprising a pivoting member, said member including an extension thereof, adapted to rigidly support a tail vane structure and including a forward portion for providing a rear plate for the generator.

7. A generator turntable mounting comprising a pivoting member, said member including an extension thereof adapted to support a tail vane structure and including a forward portion for providing a rear plate for the generator.

JOHN PRINCE.